(12) United States Patent
Crow (10) Patent No.: US 8,237,738 B1
(45) Date of Patent: Aug. 7, 2012

(54) SMOOTH RASTERIZATION OF POLYGONAL GRAPHICS PRIMITIVES (75) Inventor: Franklin C. Crow, Portola Valley, CA (US)

(73) Assignee: Nvidia Corporation, Santa Clara, CA (US)

( * ) Notice: Subject to any disclaimer, the term of this patent is extended or adjusted under 35 U.S.C. 154(b) by 335 days.

(21) Appl. No.: 11/592,826

(22) Filed: Nov. 2, 2006

(51) Int. Cl.
G09G 5/00 (2006.01)
G09G 5/02 (2006.01)
G06K 9/00 (2006.01)
G06K 9/32 (2006.01)
G06F 11/20 (2006.01)

(52) U.S. Cl. ........ 345/611; 345/428; 345/614; 345/606; 345/586; 382/266; 382/269; 382/300

(58) Field of Classification Search .................. 345/421, 345/428, 581, 586, 589, 601, 606, 611–614, 345/618, 643, 530, 545; 382/254, 266, 269, 382/271, 274, 276, 300, 303, 305
See application file for complete search history.

(56) References Cited

U.S. PATENT DOCUMENTS

| 5,287,438 | A | | 2/1994 | Kelleher |
| 5,313,287 | A | | 5/1994 | Barton |
| 5,432,898 | A | | 7/1995 | Curb et al. |
| 5,446,836 | A | | 8/1995 | Lentz et al. |
| 5,452,104 | A | | 9/1995 | Lee |
| 5,483,258 | A | | 1/1996 | Cornett et al. |
| 5,570,463 | A | | 10/1996 | Dao |
| 5,594,854 | A | * | 1/1997 | Baldwin et al. ............... 345/441 |
| 5,815,162 | A | | 9/1998 | Levine |
| 5,872,902 | A | | 2/1999 | Kuchkuda et al. |
| 6,034,699 | A | | 3/2000 | Wong et al. |
| 6,437,780 | B1 | | 8/2002 | Baltaretu et al. |
| 6,480,205 | B1 | | 11/2002 | Greene et al. |
| 6,501,564 | B1 | | 12/2002 | Schramm et al. |
| 6,522,329 | B1 | * | 2/2003 | Ihara et al. ..................... 345/441 |
| 6,606,093 | B1 | * | 8/2003 | Gossett et al. ................ 345/441 |
| 6,614,448 | B1 | | 9/2003 | Garlick et al. |
| 6,671,000 | B1 | * | 12/2003 | Cloutier ........................ 348/675 |
| 6,693,637 | B2 | | 2/2004 | Koneru et al. |

(Continued)

FOREIGN PATENT DOCUMENTS

CN 101093578 12/2007

(Continued)

OTHER PUBLICATIONS

Boyer, et al.; "Discrete Analysis for Antialiased Lines," Eurographics 2000; 3 Pages.

(Continued)

Primary Examiner — Wesner Sajous (57) ABSTRACT

A method and system for smooth rasterization of graphics primitives. The method includes receiving a graphics primitive for rasterization in a raster stage of a processor, rasterizing the graphics primitive by generating a plurality of fragments related to the graphics primitive, and determining a coverage value for each of the plurality of fragments. If one edge of the graphics primitive lies within a predetermined inter-pixel distance from a pixel center, the one edge is used to calculate the coverage value by using a distance to the pixel center. If two edges of the graphics primitive lie within the predetermined inter-pixel distance from the pixel center, a distance to the pixel center of each edge is used individually to calculate the coverage value. The resulting coverage values for the plurality of fragments are output to a subsequent stage of the processor for rendering.

22 Claims, 12 Drawing Sheets

U.S. PATENT DOCUMENTS

| | | |
|---|---|---|
| 6,717,576 B1 | 4/2004 | Duluk, Jr. et al. |
| 6,734,861 B1 | 5/2004 | Van Dyke et al. |
| 6,788,301 B2 | 9/2004 | Thrasher |
| 6,906,716 B2 | 6/2005 | Moreton et al. |
| 6,938,176 B1 | 8/2005 | Alben et al. |
| 6,956,579 B1 | 10/2005 | Diard et al. |
| 6,961,057 B1 | 11/2005 | Van Dyke et al. |
| 6,978,317 B2 | 12/2005 | Anantha et al. |
| 7,009,607 B2 | 3/2006 | Lindholm et al. |
| 7,009,615 B1* | 3/2006 | Kilgard et al. ............ 345/506 |
| 7,075,542 B1 | 7/2006 | Leather |
| 7,081,902 B1* | 7/2006 | Crow et al. ............ 345/611 |
| 7,126,600 B1 | 10/2006 | Fowler et al. |
| 7,154,066 B2 | 12/2006 | Talwar et al. |
| 7,184,040 B1 | 2/2007 | Tzvetkov |
| 7,224,364 B1 | 5/2007 | Yue et al. |
| 7,307,628 B1 | 12/2007 | Goodman et al. |
| 7,483,029 B2 | 1/2009 | Crow et al. |
| 2001/0005209 A1 | 6/2001 | Lindholm et al. |
| 2002/0097241 A1* | 7/2002 | McCormack et al. ........ 345/423 |
| 2002/0130863 A1 | 9/2002 | Baldwin |
| 2002/0158885 A1* | 10/2002 | Brokenshire et al. ......... 345/611 |
| 2003/0076325 A1 | 4/2003 | Thrasher |
| 2003/0194116 A1 | 10/2003 | Wong et al. |
| 2003/0201994 A1* | 10/2003 | Taylor et al. ............ 345/581 |
| 2004/0085313 A1 | 5/2004 | Moreton et al. |
| 2004/0183801 A1* | 9/2004 | Deering ............ 345/441 |
| 2004/0196285 A1* | 10/2004 | Rice et al. ............ 345/423 |
| 2004/0207642 A1* | 10/2004 | Crisu et al. ............ 345/626 |
| 2006/0203005 A1* | 9/2006 | Hunter ............ 345/611 |
| 2006/0245001 A1 | 11/2006 | Lee et al. |
| 2006/0267981 A1 | 11/2006 | Naoi |
| 2008/0024497 A1 | 1/2008 | Crow et al. |

FOREIGN PATENT DOCUMENTS

| | | |
|---|---|---|
| JP | 06180758 | 6/1994 |
| JP | 11195132 | 7/1999 |

OTHER PUBLICATIONS

Office Action dated Feb. 2, 2005; U.S. Appl. No. 10/671,237.
Office Action dated Aug. 22, 2005; U.S. Appl. No. 10/671,237.
Advisory Action dated Nov. 29, 2005; U.S. Appl. No. 10/671,237.
Notice of Allowance dated Apr. 4, 2006; U.S. Appl. No. 10/671,237.
A VLSI Architecture for Updating Raster-Scan Displays Satish Gupta, Robert F. Sproull, Ivan E. Sutherland August 1981 ACM SIGGRAPH Computer Graphics, Proceedings of the 8th Annual Conference on Computer Graphics and Interactive Techniques SIGGRAPH '81, vol. 15 Issue Publisher: ACM Press.
A Parallel Alogorithm for Polygon Rasterization Juan Pineda Jun. 1988 ACM.
A Hardware Assisted Design Rule Check Architecture Larry Seiler Jan. 1982 Proceedings of the 19th Conference on Design Automation DAC '82 Publisher: IEEE Press.
Non-Final OA Dated Nov. 27, 2007; U.S. Appl. No. 11/304,904.
Non-Final OA Dated May 1, 2007; U.S. Appl. No. 11/304,904.
Crow; "The Use of Grayscale for Improves Raster Display of Vectors and Characters;" University of Texas, Austin, Texas; Work supported by the National Science Foundation unser Grants MCS 76-83889; pp. 1-5: ACM Press.
Blythe, OpenGL Section 3.4.1, "Basic Line Segment Rasterization", Mar. 29, 1997, pp. 1-3.

* cited by examiner

SMOOTH RASTERIZATION OF POLYGONAL GRAPHICS PRIMITIVES

CROSS REFERENCE TO RELATED APPLICATION

This application Ser. No. 10/671,237 is related to the commonly assigned United States patent application APPARATUS, SYSTEM, AND METHOD FOR GAMMA CORRECTION OF SMOOTH PRIMITIVES, by Crow et al., filed on Sep. 24, 2003, and is incorporated herein in its entirety.

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3D images.

A problem exists however with the ability of prior art 3D rendering architectures to efficiently handle high-quality anti-aliasing of the complex 3D scenes of modern real-time 3D applications. Traditional low cost 3D graphics rendering systems generate images in which polygonal edges appear jagged or "aliased". Aliasing artifacts result from the fact that the images are drawn against a finite resolution grid of pixels of a frame buffer. A continuous image is sampled at discreet pixel centers and displayed on a finite resolution screen. Anti-aliasing is an image quality enhancing method that reduces aliasing effects apparent in the rendered image and gives the polygonal edges a much smoother appearance.

In general, anti-aliasing functions are implemented in the rasterization stage of a typical 3D graphics rendering pipeline. The rasterization stage determines which polygon fragments belong to which discreet pixels of the display. A fragment is a portion of a primitive (e.g., polygon, etc.) that covers a pixel. A pixel may contain fragments from many polygons, with each polygon typically covering more than one pixel. A pixel has a finite area and is generally considered to have square shape.

The implementation of high-quality anti-aliasing imposes a heavy computational burden on the graphics rendering pipeline. Each fragment belonging to a pixel contributes its color to the overall color of the pixel. A primary factor in this contribution is the area of the fragment. The color of a pixel is a weighted blend of colors of all fragments contained within the pixel. The fragment area is used as a blending weight. Thus, the fragment area plays a very important role in the anti-aliasing process, and therefore an accurate computation of the fragment area is required. However, computing fragment area directly from its shape is very processor intensive, since the shape of a fragment can vary depending upon the polygon's shape and orientation.

The high computational burden required for high-quality anti-aliasing has led to a number of prior art shortcut schemes to provide anti-aliased image quality while reducing the computational workload. Such schemes involve, for example, the use of coverage masks, the use of multiple sample points per pixel, and the like. However each of these prior art schemes involve trade-offs in the accuracy of the estimation of fragment area, in image quality, and in computational speed.

Thus, a need exists for a rasterization method that can produce high-quality anti-aliased images while minimizing the additional overhead computations needed to support such anti-aliasing.

SUMMARY OF THE INVENTION

Embodiments of the present invention provide a method and system for an anti-aliasing process that can produce high-quality anti-aliased images while minimizing the additional overhead computations needed to support such anti-aliasing.

In one embodiment, the present invention is implemented as a method for the smooth rasterization of graphics primitives. The method includes receiving a graphics primitive (e.g., a triangle polygon) for rasterization in a raster stage of a processor (e.g., a GPU), rasterizing the graphics primitive by generating a plurality of fragments related to the graphics primitive, and determining a coverage value for each of the plurality of fragments. If one edge of the graphics primitive lies within a predetermined distance from a pixel center, the one edge is used to calculate the coverage value by using a distance to the pixel center. If two edges of the graphics primitive lie within a predetermined distance from the pixel center, a distance to the pixel center of each edge is used individually to calculate the coverage value. The resulting coverage values for the plurality of fragments are output to a subsequent stage of the processor for rendering. In one embodiment, the predetermined distance is half an inter-pixel distance. In one embodiment, the half interpixel distances may be increased or decreased in order to optimize the overall effectiveness of the coverage value calculation process.

In one embodiment, three normalized edges of a triangle (e.g., the graphics primitive) are evaluated at the center of each pixel related to the triangle. If one edge lies within a predetermined distance from the pixel center, then the one edge can be used to calculate the coverage value by using a signed distance to the pixel center. In one embodiment, if two edges lie within half an inter-pixel distance from the pixel center, then the coverage value for each of the two edges can be calculated individually, summed, and then the coverage value of a fully covered pixel subtracted to obtain a total coverage. If a pixel lies more than half an inter-pixel distance outside any one of the edges of the graphics primitive, the pixel can be considered uncovered, and similarly, if a pixel lies more than half an inter-pixel distance inside all edges of the graphics primitive, the pixel can be considered fully covered. In each case, a lookup table can be indexed with a plurality of distances to a pixel center to obtain respective coverage values for the respective distances to the pixel center.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
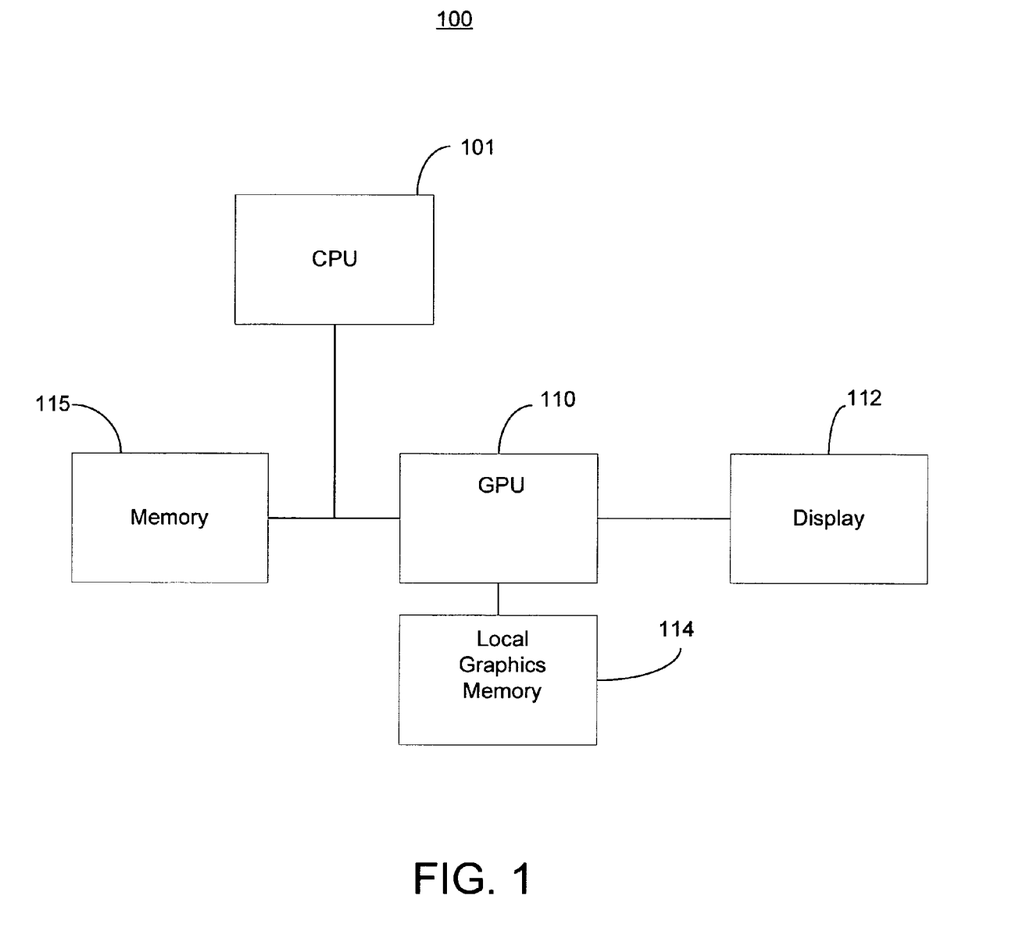
FIG. 1 shows a computer system in accordance with one embodiment of the present invention.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

EMBODIMENTS OF THE INVENTION

Embodiments of the present invention implement a method and system for the smooth rasterization of graphics primitives. The method includes receiving a graphics primitive (e.g., a triangle polygon) for rasterization in a raster stage of a processor (e.g., a GPU), rasterizing the graphics primitive by generating a plurality of fragments related to the graphics primitive, and determining a coverage value for each of the plurality of fragments. If one edge of the graphics primitive lies within half an inter-pixel distance from a pixel center, the one edge is used to calculate the coverage value by using a distance to the pixel center. If two edges of the graphics primitive lie within half an inter-pixel distance from the pixel center, a distance to the pixel center of each edge is used individually to calculate the coverage value. The resulting coverage values for the plurality of fragments are output to a subsequent stage of the processor for rendering. Embodiments the present invention and their benefits are further described below.

Figure 2:
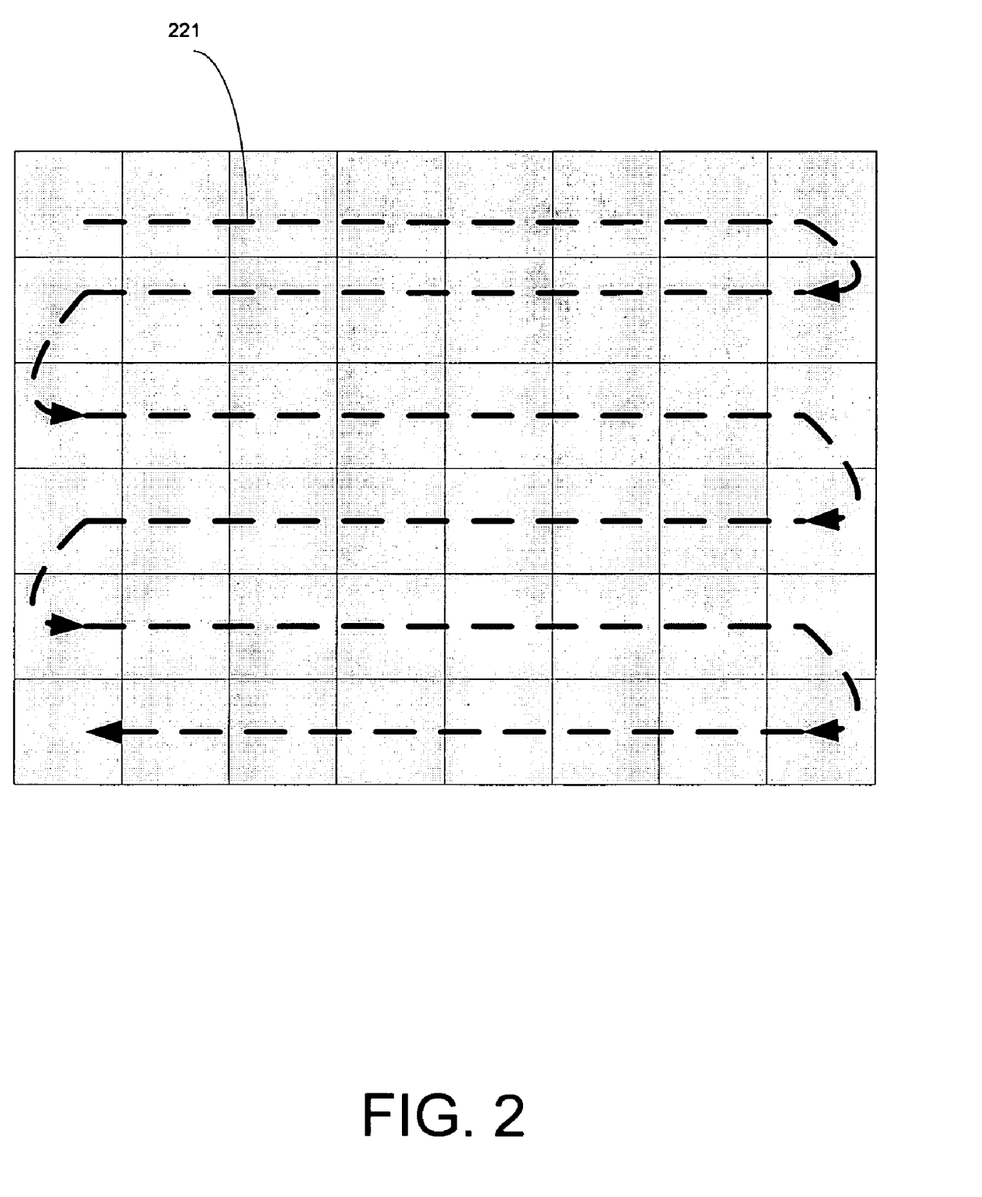
FIG. 2 shows a diagram depicting a grid of pixels being rasterized in a boustrophedonic pattern in accordance with one embodiment of the present invention.

FIG. 2 shows a diagram depicting a grid of pixels being rasterized in a boustrophedonic pattern in accordance with one embodiment of the present invention.

In one embodiment, as depicted in FIG. 2, a raster stage of the GPU 110 utilizes a boustrophedonic pattern for traversing a graphics primitive, as indicated by the dotted line 221. In such an embodiment, each pixel of the grid of pixels is traversed in the order indicated by the line 221. The line 221 shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field.

Thus, as depicted in FIG. 2, the boustrophedonic rasterization traces out serpentine pattern that folds back and forth along a predominant axis. In the FIG. 2 example, the predominant axis is horizontal. A horizontal boustrophedonic sequence, for example, may generate all the pixels within a primitive triangle that are on one row from left to right, and then generate the next row right to left, and so on. Such a folded path ensures that an average distance from a generated tile to recently previously generated pixel is relatively small, which has advantages for maintaining a cache of relevant data and reducing the memory requests required for frame buffer and texture access. Additionally, it should be noted that the boustrophedonic traversal pattern can be implemented on a tile-by-tile basis (e.g., from a generated tile to a recently previously generated tile) as opposed to a pixel-by-pixel basis. In such embodiment, each tile would be comprised of a group of pixels (e.g., 4×4 pixels, 8×8 pixels, 16×16, etc.).

Additional details regarding boustrophedonic pattern rasterization can be found in US patent application "A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005, which is incorporated herein by its entirety.

It should be noted that although embodiments of the present invention are described in the context of boustrophedonic rasterization, other types of rasterization patterns can be used. For example, the algorithms and GPU stages described herein for rasterizing pixels can be readily applied to traditional left-to-right, line-by-line rasterization patterns.

Figure 3:
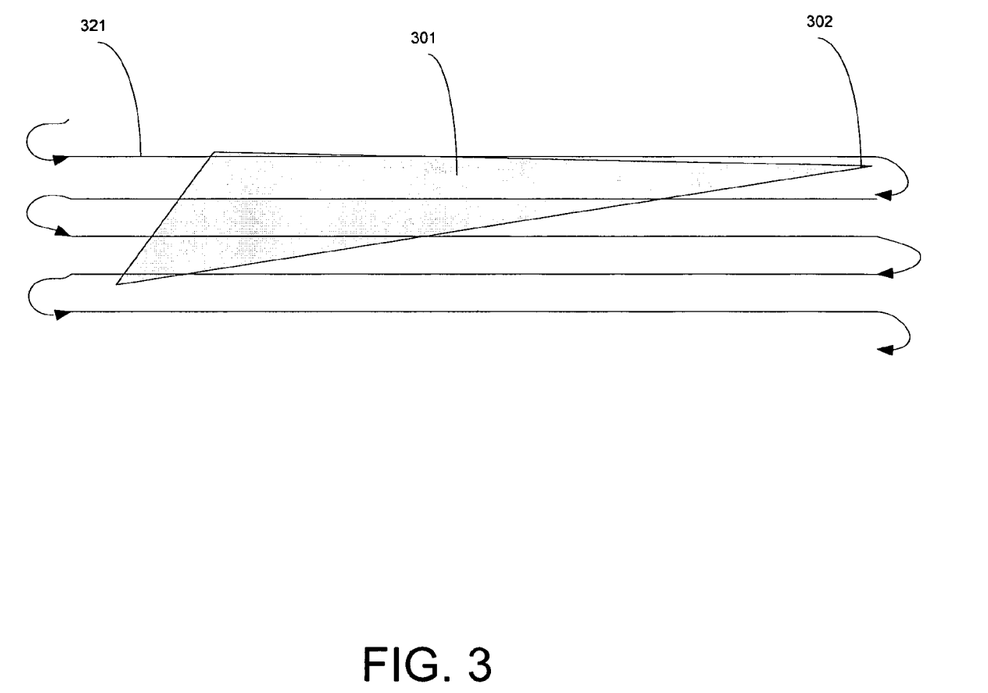
FIG. 3 shows a diagram of a triangle polygon against a rasterization pattern for a raster unit of a GPU in accordance with one embodiment of the present invention.

FIG. 3 shows a diagram of a triangle polygon 301 (e.g., triangle 301) against a rasterization pattern 321 for a raster unit of the GPU 110 in accordance with one embodiment of the present invention. As described above, the line 321 shows a boustrophedonic pattern of traversal.

Figure 4:
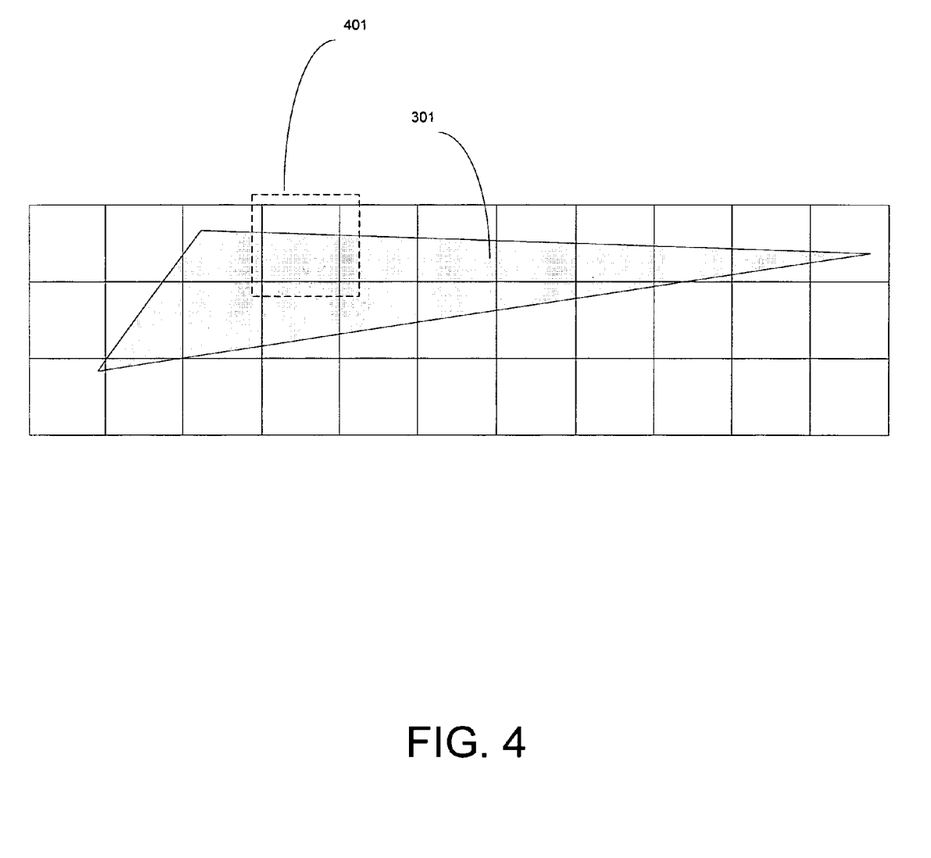
FIG. 4 shows a diagram of the triangle against a grid of pixels as they are examined by a raster unit of a GPU in accordance with one embodiment of the present invention.

FIG. 4 shows a diagram of the triangle 301 against a grid of pixels as they are examined by a raster unit of the GPU 110 accordance with one embodiment of the present invention. In FIG. 4, each of the illustrated squares represents a pixel. An exemplary one of the pixels (e.g., pixel 401) that is partially covered by the triangle polygon 301 is shown.

Figure 5:
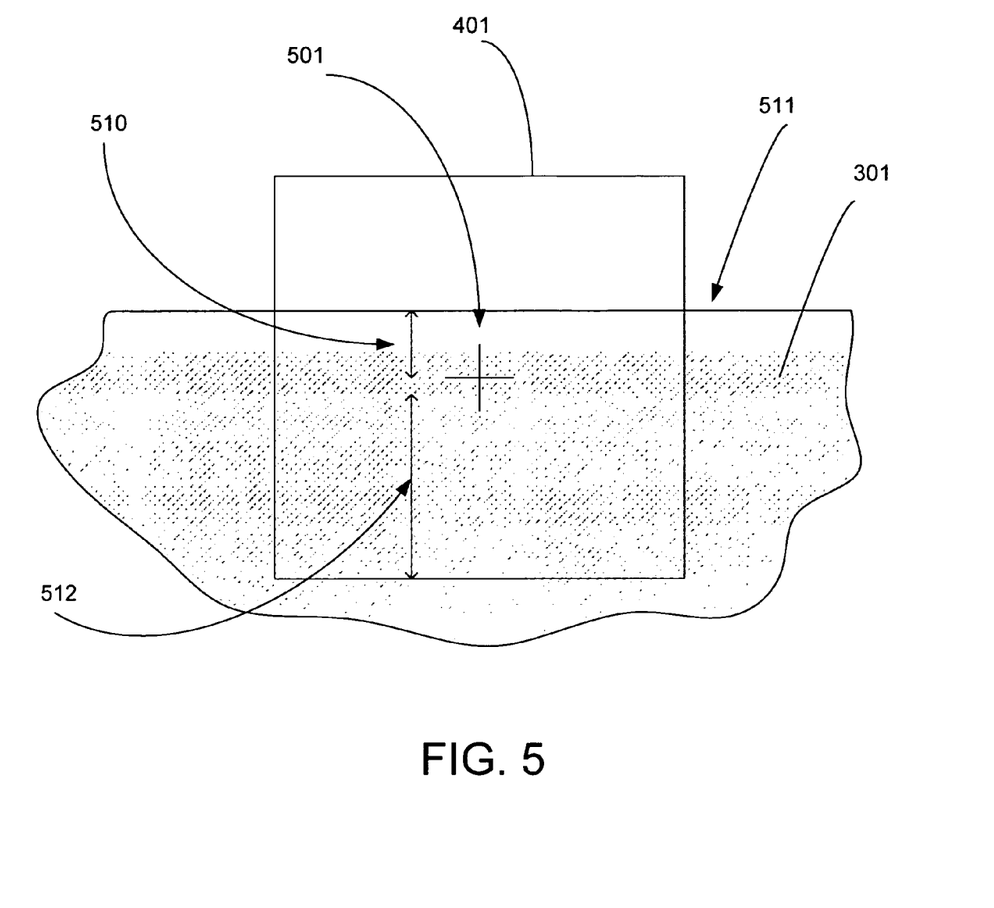
FIG. 5 shows a diagram depicting an exemplary pixel from a grid of pixels intersecting a triangle polygon in accordance with one embodiment of the present invention.

FIG. 5 shows a diagram depicting the pixel 401 in greater detail. As illustrated, the pixel 401 is partially covered by the triangle 301, a portion of which is shown in FIG. 5. In this example, the exemplary pixel 401 contains a fragment from the triangle polygon 301. As used herein, a fragment refers to that portion of a polygon (e.g., triangle 301) that covers a pixel (e.g., pixel 401). Generally, a pixel may contain fragments from many polygons, with each polygon typically covering more than one pixel, such as triangle 301. Each fragment belonging to a pixel contributes its color to the overall color of the pixel and the weight of this contribution depends upon the area of the fragment. Embodiments of the present invention efficiently determine a coverage value for each of the plurality of fragments resulting from the rasterization of the triangle 301 against the pixel grid. For example, to represent a smooth triangle in an image, the raster unit calculates the percentage of each pixel that is covered by the triangle 301 and uses that percentage to blend with other surfaces covering the same pixel (e.g., pixel 401) or with the background color. The percent coverage of a pixel is generally referred to as the fragment area.

Embodiments of the present invention implement a method whereby the three normalized edges of a triangle (e.g., the graphics primitive) are evaluated at the center of each pixel related to the triangle.

If one edge of the graphics primitive lies within half an inter-pixel distance from a pixel center, the one edge is used to calculate the coverage value by using a distance to the pixel center. This is shown in FIG. 5 as the distance 510 of the edge 511 from the pixel center 501. The distance 510 indicates that the edge 511 covers more than half the pixel 401, and the degree of this coverage is indicated by the magnitude of the distance 510.

Thus, as shown in FIG. 5, if the one edge (e.g., edge 511) lies within half an inter-pixel distance from the pixel center 501, that one edge is used to calculate the coverage value by using a signed distance 510 to the pixel center 501. This is shown in FIG. 5 as the signed distance 510 plus the one half 512.

In one embodiment, the distance 510 is used to index a coverage lookup table (e.g., coverage lookup table 1103 shown in FIG. 11 below) and obtain a coverage value corresponding thereto. The use of a coverage lookup table allows a rapid correlation between the inter-pixel distance between a given edge and a pixel center, and a percent coverage value (e.g., fragment area) that corresponds to this distance. Additional descriptions regarding the use of a lookup table to obtain coverage values can be found in U.S. patent application Ser. No. 10/671,237 "APPARATUS, SYSTEM, AND METHOD FOR GAMMA CORRECTION OF SMOOTH PRIMITIVES, by Crow et al., filed on Sep. 24, 2003, which is incorporated herein in its entirety.

Figure 6:
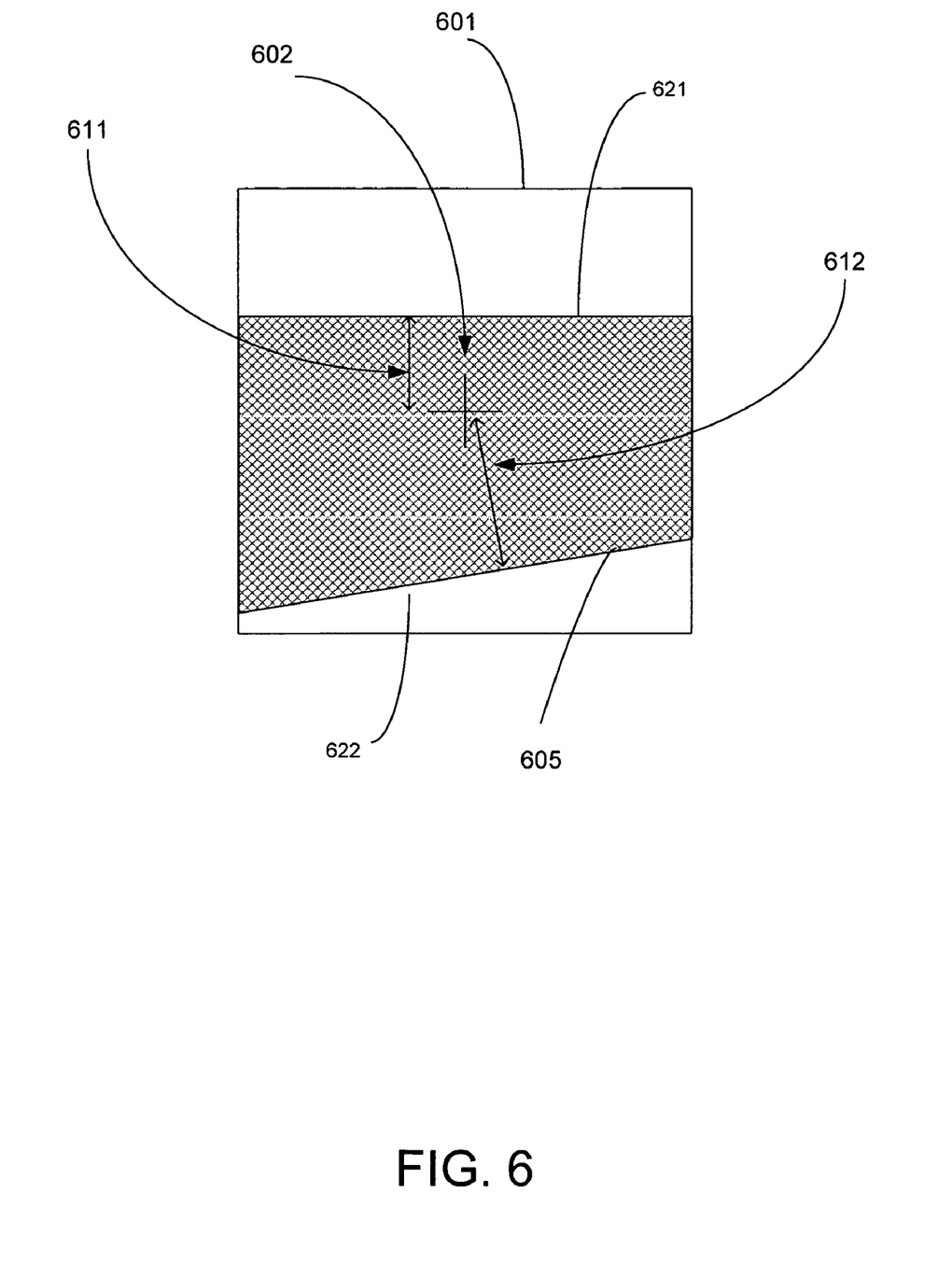
FIG. 6 shows a diagram depicting an exemplary pixel having two edges from a graphics primitive passing through its boundaries in accordance with one embodiment of the present invention.

FIG. 6 shows a diagram depicting an exemplary pixel 601 having two edges 621 and 622 from a graphics primitive 605. As illustrated, the pixel 601 is partially covered by a triangle 605, a portion of which is shown.

As shown in FIG. 6, in one embodiment, if two edges (e.g., edge 621 and edge 622) lie within half an inter-pixel distance from a pixel center 602, then the coverage value for each of the two edges is calculated individually, summed, and then the coverage value of a fully covered pixel subtracted to obtain a total coverage. For example, as shown in FIG. 6, where the triangle 605 passes two of its edges through the pixel 601 (e.g., a long skinny triangle, etc.), the coverage value for each of the edges 621-622 is first calculated individually, for example, by using the distance 611 for the edge 621 and the distance 612 for the edge 622. These coverage values are then added together. The sum of the two coverage values minus the coverage value of a fully covered pixel gives the corrected total coverage (e.g., fragment area) for the triangle. This property is illustrated in FIG. 8 below.

Figure 7:
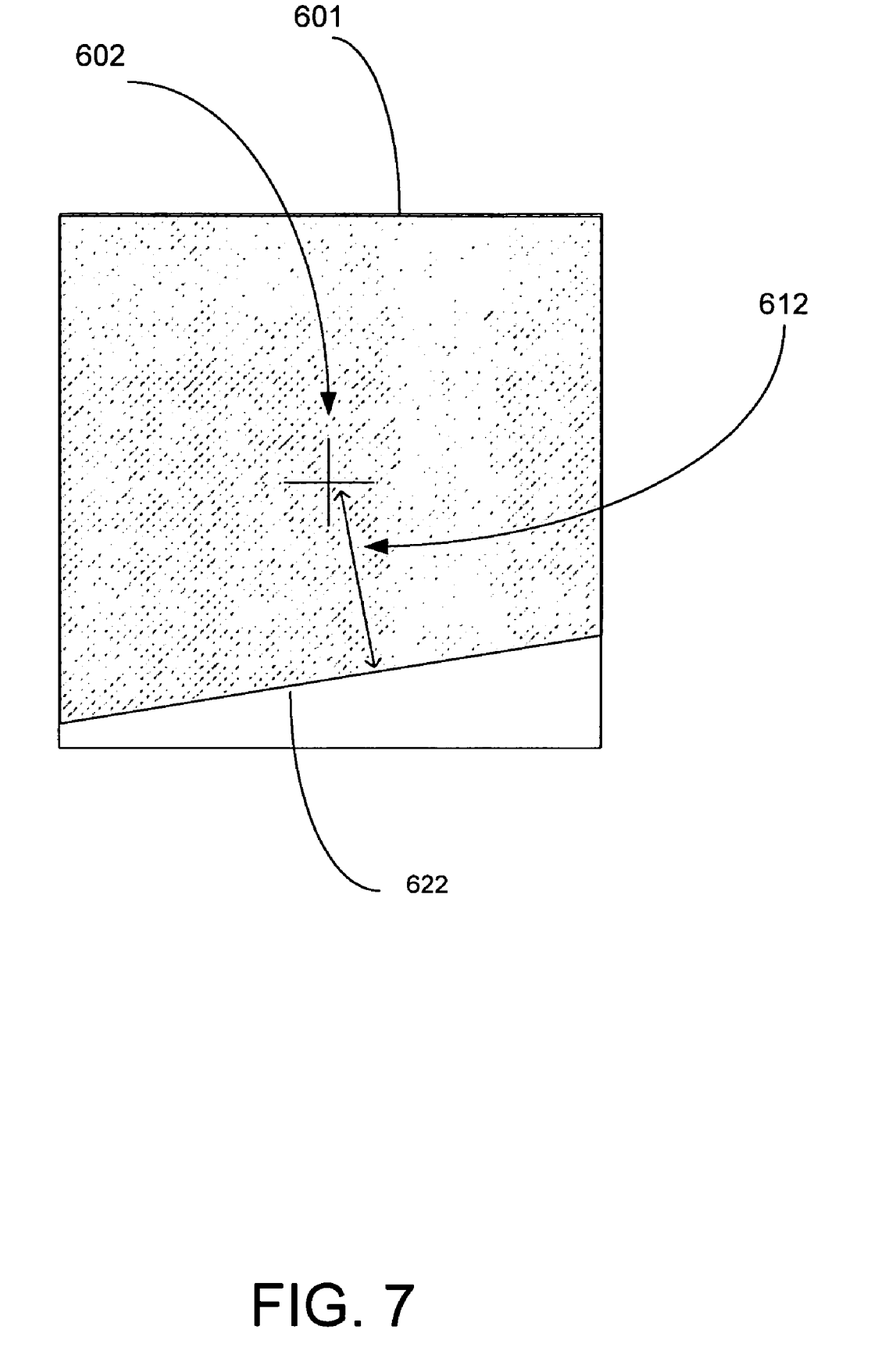
FIG. 7 illustrates the coverage value resulting from the individual computation of the coverage from a first edge passing through the boundary of a pixel in accordance with one embodiment of the present invention.

FIG. 7 illustrates the coverage value resulting from the individual computation of the coverage from the edge 622. As described above, the edge 622 is used to calculate the coverage value by using a signed distance 612 to the pixel center 602. The resulting area is shown in FIG. 7 by a right-handed crosshatch.

Figure 8:
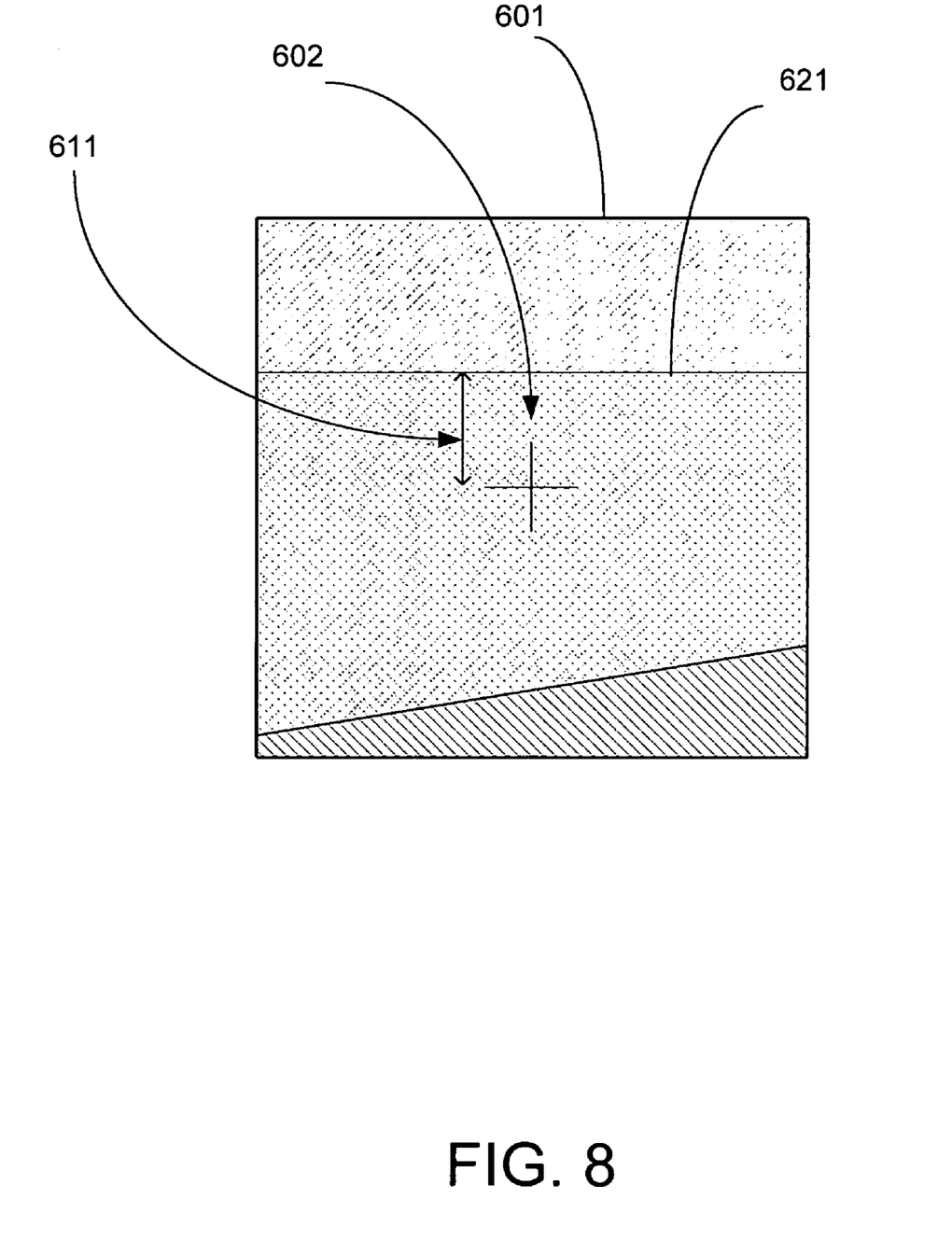
FIG. 8 illustrates the coverage value resulting from the individual computation of the coverage from a second edge passing through the boundary of a pixel in accordance with one embodiment of the present invention.

FIG. 8 illustrates the coverage value resulting from the combined coverage from edge 621 and edge 622. As described above, the edge 621 is used to calculate the coverage value by using a signed distance 611 to the pixel center 602. The resulting area is shown in FIG. 8 by a left-handed crosshatch. The two crosshatched areas shown in FIG. 8 are then added together, which in this case, yields a number greater than 1.0 (e.g., 1.7). The resulting doubly crosshatched area is the desired result. Thus, FIG. 8 illustrates why it is necessary to subtract a full pixel area (e.g., all of the single crosshatched area plus the doubly crosshatched area which has been counted twice) from the sum of the two. Embodiments of the present invention take advantage of the fact that once the total area of the pixel (e.g., 1.0) is subtracted from this sum, the remainder yields the correct coverage of the fragment (e.g., 1.7-1.0 equals 0.7).

It should be noted that in each case, the distances 611 and 612 are used to index a coverage lookup table (e.g., covers lookup table 1103 shown in FIG. 11) to obtain a coverage value corresponding thereto, as described above.

Additionally, it should be noted that if a pixel lies more than half an inter-pixel distance outside any one of the edges of the graphics primitive, the pixel is considered uncovered. Similarly, if a pixel lies more than half an inter-pixel distance inside all edges of the graphics primitive, the pixel is considered fully covered. It should be noted that the half-pixel distance as used herein is exemplary. Different predetermined distances can be utilized to optimize the obtained results. For example, differing implementations can use different values for this distance for different situations.

Figure 9:
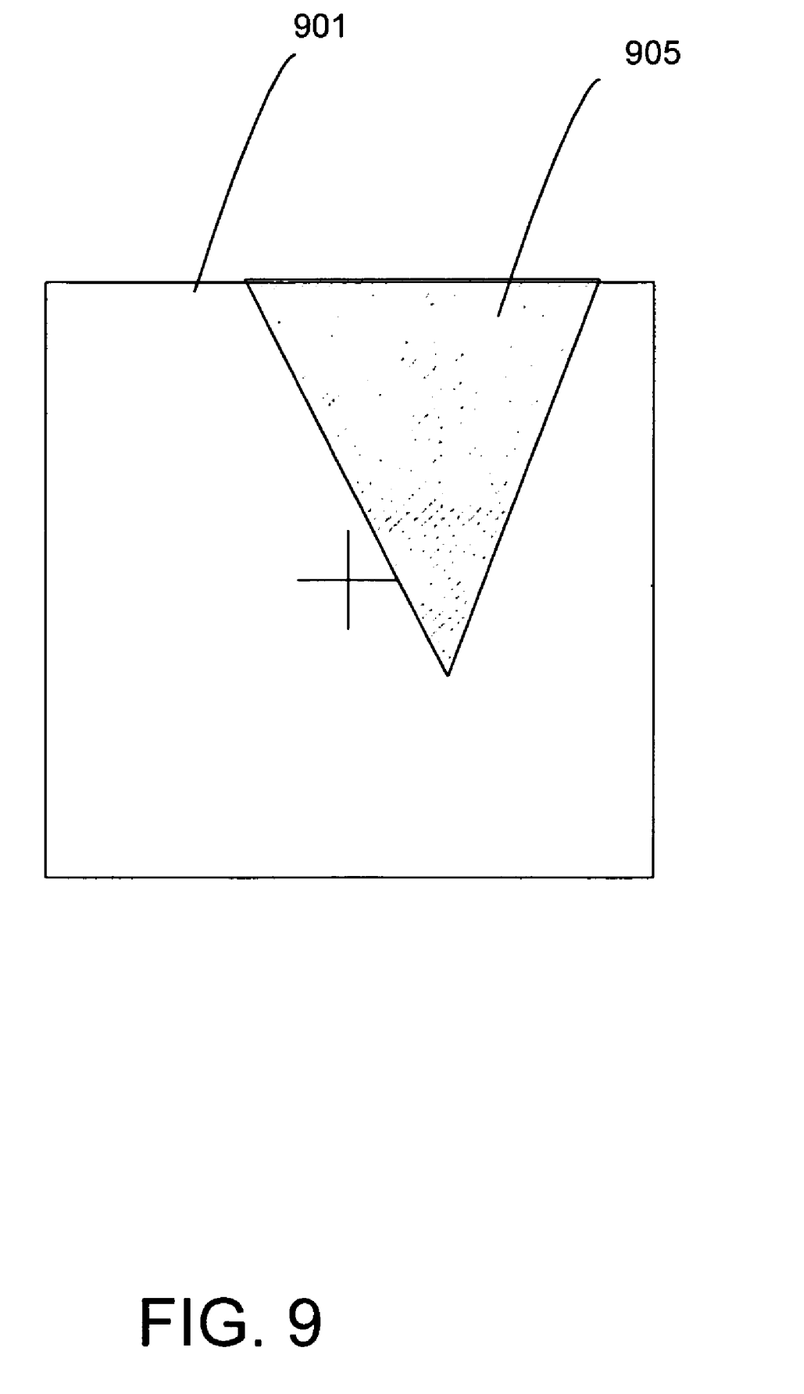
FIG. 9 shows a diagram of a pixel where a triangle polygon has a point within the boundaries of the pixel in accordance with one embodiment of the present invention.

FIG. 9 shows a diagram of a pixel 901 where a triangle polygon 905 has a point within the boundaries of the pixel 901. FIG. 9 shows a problematic case whereby a vertex of the triangle polygon lies within the boundaries of a pixel. In such cases, the computed coverage area determined as described above can at times yield negative coverage values (e.g., where the resulting coverage value is a negative number). In such cases, in one embodiment, the present invention is configured to clamp the resulting computed coverage value to 0.0, thereby preventing the generation of any negative coverage values. This increases the stability of the graphics rendering process by preventing negative coverage values from being propagated down the pipeline.

It should be noted that in some cases, a triangle polygon may exist such that all three edges of the triangle lie within the same pixel. In such cases, the calculated coverage from the third edge reduces the coverage due to the first edge and second edge of the triangle. In one embodiment, the reduction is computed by scaling the coverage due to the first and second edges by the ratio of the coverage due to the third edge over the full pixel area (e.g., the coverage of a fully covered pixel).

Figure 10:
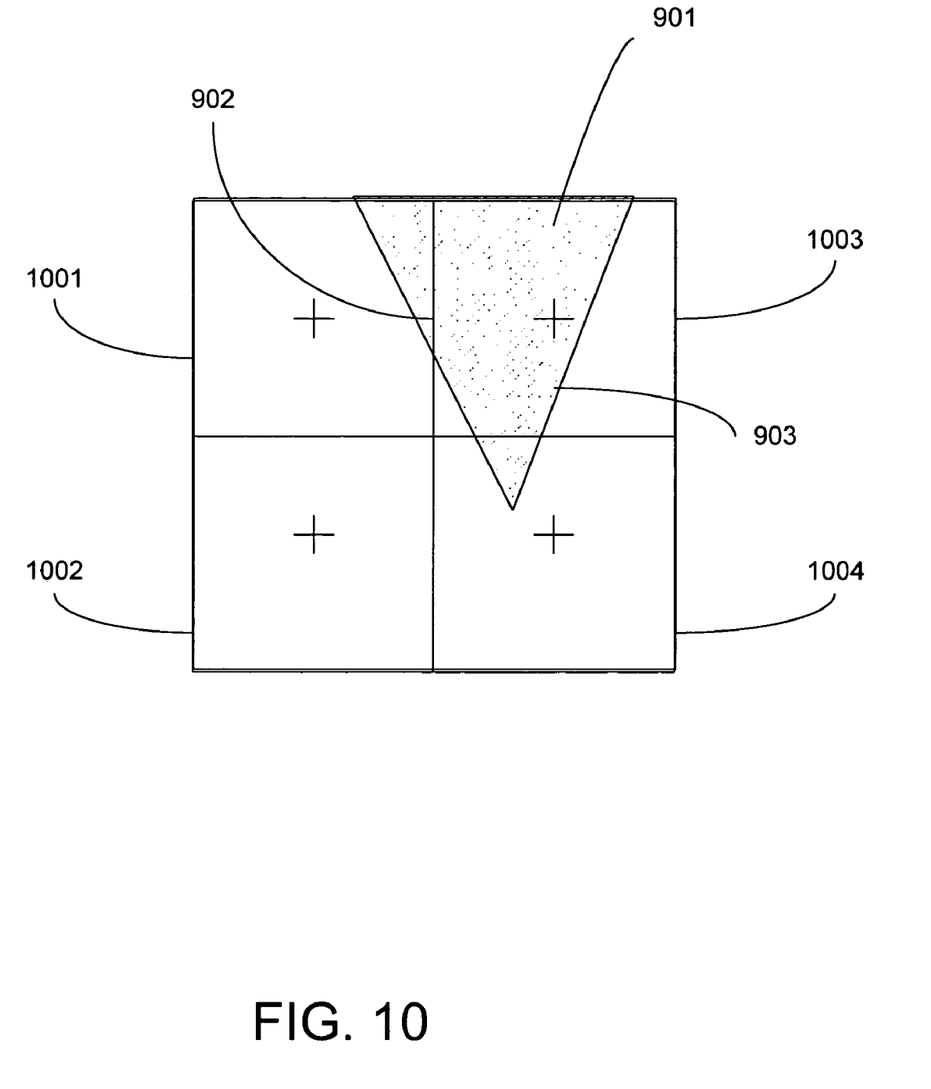
FIG. 10 shows a diagram of a pixel where a triangle polygon has been subdivided within the boundaries of the pixel in accordance with one embodiment of the present invention.

FIG. 10 shows a diagram of the pixel 901 having been subdivided into a plurality of sub pixels 1001-1004. FIG. 10 shows a solution used by one embodiment of the present invention to solve the problem where the vertex of a triangle polygon lies within the boundaries of a pixel (e.g., pixel 901 of FIG. 9). As depicted in FIG. 10, the triangle polygon rasterized against the daughter sub pixels 1001-1004. The subdivision of the pixel 901 into the daughter sub pixels 1001-1004 increases the number of sub pixel areas that do not have a vertex in them, thereby reducing the impact of the subpixel area that does. The determination of coverage due to the resulting daughter sub pixels 1001-1004 can yield better anti-aliasing results in comparison to a clamping embodiment as described above.

Figure 11:
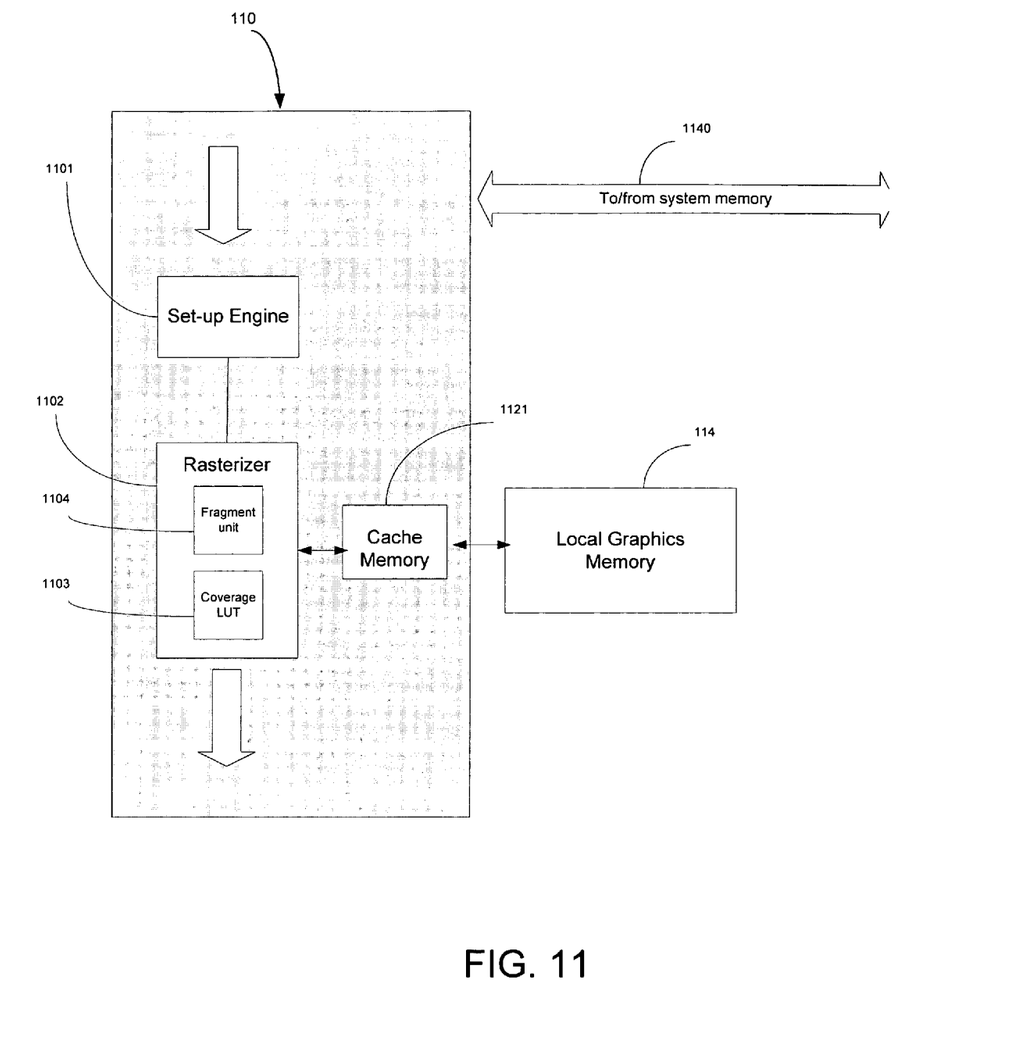
FIG. 11 shows a diagram of internal components of a GPU in accordance with one embodiment of the present invention.

FIG. 11 shows a diagram of internal components of the GPU 110 in accordance with one embodiment of the present invention. As shown in FIG. 11, the GPU 110 includes a set-up unit 1101 and a rasterizer unit 1102. Generally, the set-up unit 1101 functions by converting descriptions based on vertices to descriptions based on edge descriptions. The rasterizer unit 1102 converts the edge descriptions received from set-up unit 1101 into filled areas comprising actual pixel descriptions (e.g., pixel areas, pixel sub-samples, etc.). The pixel descriptions are subsequently passed along to the fragment unit 1104 for further processing.

The rasterizer unit 1102 provides fragment data and fragment program instructions to the fragment unit 1104. One or more fragment programs configure the fragment unit 1104 to process fragment data by specifying computations and computation precision. The raster unit 1102 further includes a coverage lookup table 1103 for looking up coverage values corresponding to distances from a pixel center, as described above.

Referring still to FIG. 11, the GPU 110 further includes a cache memory 1121 that functions by implementing high-speed low latency storage for the most frequently used graphics rendering data. Such data typically comprises texture information, vertex information, colors, and the like. The cache memory 1121 is shown coupled to the local graphics memory 114. The cache memory 1121 utilizes one or more cache maintenance mechanisms to maintain coherency with the local graphics memory 114. The arrow 1140 shows the communications pathway between the GPU 110 and the system memory (e.g., memory 115 shown in FIG. 1).

Figure 12:
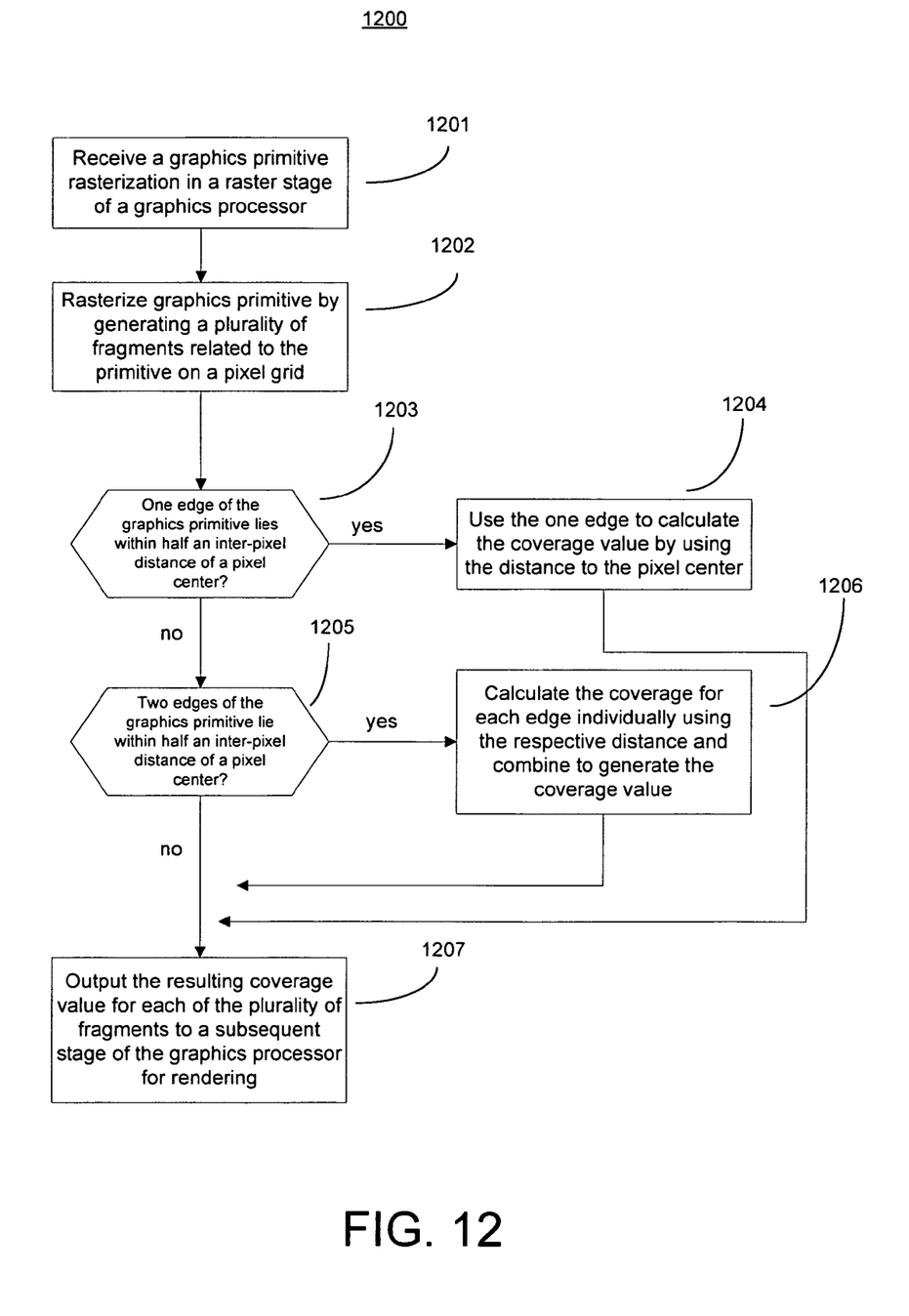
FIG. 12 shows a flowchart of the steps of a process for smooth primitive rasterization in accordance with one embodiment of the present invention.

FIG. 12 shows a flowchart of the steps of a process 1200 for smooth primitive rasterization in accordance with one embodiment of the present invention. As depicted in FIG. 12, process 1200 shows the steps involved in rasterizing a graphics primitive and calculating coverage values for fragments resulting from the rasterization process.

Process 1200 begins in step 1201, where a graphics primitive is received for rasterization in a raster stage of a graphics processor. In step 1202, the graphics primitive is rasterized by generating a plurality of fragments related to the primitive on a pixel grid. As described above, fragments are those portions of a polygon that cover a pixel, and a pixel may contain fragments from many polygons. Each fragment belonging to a pixel contributes its color to the overall color of the pixel and the weight of this contribution depends upon the area, or percent a pixel coverage, of the fragment.

In step 1203, a determination is made as to whether one edge of the graphics primitive lies within a predetermined distance from a pixel center. If so, process 1200 proceeds to step 1204, where the one edge is used to calculate the coverage value by using the distance to the pixel center. As described above, this distance can be used to index a lookup table (e.g., coverage lookup table 1103) and obtain a corresponding coverage value there from. In step 1205, a determination is made as to whether two edges of the graphics primitive lie within a predetermined distance from a pixel center. If so, process 1200 proceeds to step 1206 where the coverage is calculated for each edge individually using the respective distance, and then combined to generate the coverage value. For example, as described above, where a triangle passes two of its edges through a pixel, the coverage value for each of the edges is first calculated individually, and then added together. The sum of the two coverage values minus one gives the corrected total coverage value for the triangle. Subsequently, in step 1207, the resulting coverage values for each of the plurality of fragments are output to a subsequent stage of the graphics processor for rendering.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for smooth rasterization of graphics primitives to render pixels of a display, comprising:
  rasterizing a graphics primitive by generating a plurality of fragments related to the graphics primitive by using a graphics processor; and
  determining a coverage value for each of the plurality of fragments by:
    if one edge of the graphics primitive lies within a predetermined distance from a pixel center, using the one edge to calculate the coverage value by using a distance to the pixel center; and
    if a plurality of edges of the graphics primitive lie within the predetermined distance from the pixel center, using a distance to the pixel center of each of the plurality of edges individually to calculate the coverage value.

2. The method of claim 1, wherein the graphics primitive is a triangle and three normalized edges of the triangle are evaluated at the center of each pixel related to the triangle.

3. The method of claim 1, wherein if the one edge lies within the predetermined distance from the pixel center, then the one edge is used to calculate the coverage value by using a signed distance to the pixel center plus one-half.

4. The method of claim 1, wherein if the plurality of edges lie within the predetermined distance from the pixel center, then the coverage value for each of the plurality of edges is calculated individually, summed, and a coverage value of a fully covered pixel is subtracted to obtain a total coverage.

5. The method of claim 1, wherein if a pixel lies more than the predetermined distance outside any one of the edges of the graphics primitive, the pixel is considered uncovered, and wherein if a pixel lies more than the predetermined distance inside all edges of the graphics primitive, the pixel is considered fully covered.

6. The method of claim 1, wherein the predetermined distance is half an inter-pixel distance.

7. The method of claim 1, wherein a plurality of resulting coverage values are clamped to zero to prevent negative coverage values from being output to the subsequent stage of the graphics processor for rendering.

8. The method of claim 1, further comprising:
  subdividing the pixel into a plurality of daughter sub pixels if a point of the graphics primitive lies within the pixel.

9. The method of claim 1, wherein if a pixel includes a first edge, a second edge, and a third edge of a triangle polygon, a coverage from the third edge causes a reduction in coverage due to the first edge and second edge, and wherein the reduction is computed by scaling the coverage due to the first edge and the second edge by a ratio of the coverage from the third edge over the pixel area.

10. A GPU (graphics processor unit), comprising:
  a raster unit, wherein the raster unit receives a graphics primitive and generates a plurality of fragments related to the graphics primitive and determines a coverage value for each of the plurality of fragments to render an image by:
    if one edge of the graphics primitive lies within a predetermined distance from a pixel center, using the one edge to calculate the coverage value by using a distance to the pixel center; and
    if two edges of the graphics primitive lie within the predetermined distance from the pixel center, using a distance to the pixel center of each edge individually to calculate the coverage value.

11. The GPU of claim 10, wherein the predetermined distance is one half an distance, and wherein the graphics primitive is a triangle and three normalized edges of the triangle are evaluated at the center of each pixel related to the triangle.

12. The GPU of claim 10, wherein if the one edge lies within the predetermined distance from the pixel center, then the one edge is used to calculate the coverage value by using a signed distance to the pixel center plus one-half.

13. The GPU of claim 10 wherein if the two edges lie within the predetermined distance from the pixel center, then the coverage value for each of the two edges is calculated individually, summed, and a coverage value of a fully covered pixel is subtracted to obtain a total coverage.

14. The GPU of claim 10, wherein if a pixel lies more than the predetermined distance outside any one of the edges of the graphics primitive, the pixel is considered uncovered.

15. The GPU of claim 10, wherein if a pixel lies more than the predetermined distance inside all edges of the graphics primitive, the pixel is considered fully covered.

16. The GPU of claim 10, wherein a lookup table is indexed with a plurality of distances to a pixel center to obtain a respective coverage value for a respective distance to the pixel center.

17. A computer system, comprising:
a system memory;
a central processor unit coupled to the system memory; and
a graphics processor unit communicatively coupled to the central processor unit;
a rasterizer unit within the graphics processor unit generating a plurality of fragments related to the graphics primitive and determining a coverage value for each of the plurality of fragments by:
if one edge of the graphics primitive lies within a predetermined distance from a pixel center, using the one edge to calculate the coverage value by using a distance to the pixel center;
if two edges of the graphics primitive lie within a predetermined distance from the pixel center, using a distance to the pixel center of each edge individually to calculate the coverage value, wherein a lookup table coupled to the rasterizer unit is indexed with a plurality of distances to a pixel center to obtain a respective coverage value for a respective distance to the pixel center; and
the raster unit further configured to output the resulting coverage values for the plurality of fragments to a subsequent stage of the graphics processor unit for rendering.

18. The system of claim 17, wherein the graphics primitive is a triangle and three normalized edges of the triangle are evaluated at the center of each pixel related to the triangle.

19. The system of claim 17, wherein if the one edge lies within half an inter-pixel distance from the pixel center, then the one edge is used to calculate the coverage value by using a signed distance to the pixel center plus one-half.

20. The system of claim 17 wherein if the two edges lie within half an inter-pixel distance from the pixel center, then the coverage value for each of the two edges is calculated individually, summed, and one subtracted to obtain a total coverage.

21. The system of claim 17, wherein if a pixel lies more than half an inter-pixel distance outside any one of the edges of the graphics primitive, the pixel is considered uncovered, and wherein if a pixel lies more than half an inter-pixel distance inside all edges of the graphics primitive, the pixel is considered fully covered.

22. The system of claim 17, wherein the pixel is subdivided into a plurality of daughter sub-pixels if a point of the graphics primitive lies within the pixel.

* * * * *